(12) United States Patent
Choi et al.

(10) Patent No.: US 7,721,252 B2
(45) Date of Patent: May 18, 2010

(54) APPARATUS AND METHOD FOR PRODUCT-LINE ARCHITECTURE DESCRIPTION AND VERIFICATION

(75) Inventors: Youhee Choi, Taejon (KR); Seungyun Lee, Gyeonggi-Do (KR); Gyu Sang Shin, Taejon (KR); Young Jong Yang, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 1350 days.

(21) Appl. No.: 11/121,994

(22) Filed: Jul. 6, 2005

(65) Prior Publication Data

US 2006/0136864 A1    Jun. 22, 2006

(30) Foreign Application Priority Data

Dec. 21, 2004    (KR) ............... 10-2004-0109132

(51) Int. Cl.
*G06F 9/44* (2006.01)
(52) U.S. Cl. ............... 717/104; 717/100; 717/105; 717/126
(58) Field of Classification Search ............... None
See application file for complete search history.

(56) References Cited

U.S. PATENT DOCUMENTS

| | | | |
|---|---|---|---|
| 7,543,269 B2 * | 6/2009 | Krueger et al. ............... 717/107 |
| 2004/0064803 A1 | 4/2004 | Graves et al. | |
| 2006/0129418 A1 * | 6/2006 | Lee et al. ............... 705/1 |
| 2008/0162212 A1 * | 7/2008 | Clayton et al. ............... 705/7 |

FOREIGN PATENT DOCUMENTS

KR    2002-0091071    12/2002

OTHER PUBLICATIONS

Mannion, "Using First-Order Logic for Product Line Model Validation," Springer Berlin/Heidelberg, Jan. 1, 2002.*
Diaz-Herrera et al, "Aspect-Oriented UML Modeling for Developing Embedded Systems product lines," SPSU, Jan. 31, 2000.*
Riebisch et al., "Modeling Variability for Object-Oriented Product Lines," Springer Berlin/Heidelberg, Jun. 8, 2004.*
Myllymaki, "Variability Management in Software Product Lines," TUT, Mar. 12, 2001.*

(Continued)

*Primary Examiner*—Insun Kang
(74) *Attorney, Agent, or Firm*—Lowe Hauptman Ham & Berner LLP

(57) ABSTRACT

An apparatus and a method for a product-line description and verification is provided. The apparatus includes: a product-line architecture model conversion tool for classifying related architecture model components according to variant characteristics by analyzing inputted scenarios, generating a dependency relationship model by extracting a dependency relationship between architecture model elements based on a variant element, and generating a product-line architecture from an inputted architecture model based on the dependency relationship model; and a product-line architecture verification tool for receiving a scenario of a system requirement, mapping the scenario to related architecture model components, analyzing an architecture model dependency by analyzing static modeling information and dynamic modeling information of a product architecture, and generating an aspect model of the requirements, the scenario and the related architecture model components.

6 Claims, 14 Drawing Sheets

OTHER PUBLICATIONS

Zhang et al., "XVCL: a mechanism for handling variants in software product lines," Jul. 24, 2004.*

"Software Variability Management," Jilles Van Gurp & jan Bosch, Feb. 2003.*

Robak et al., "Extending the UML for Modelling Variability for System Families," AMCS, 2002.*

Trigaux et al., "Software Product Lines: State of the art," Sep. 15, 2003.*

Ziadi et al., "Product Line Derivation with UML," 2003.*

"Product Line class architecture derivation," Oct. 23, 2003.*

Ziadi et al., "Towards a UML profile for software product lines," 2003.*

Marco Sinnema, et al.; "*COVAMOF: A Framework for Modeling Variability in Software Product Families*"; R.L. Nord (Ed.): SPLC 2004, LNCS 3154; 2004; pp. 197-213.

Jun Kong; et al.; "*A Graph Grammar Approach to Software Architecture Verification and Transformation*"; Proceeding of the 27th Annual International Computer Software and Applications Conference COMPSAC'03).

* cited by examiner

Scenario & Aspect oriented Verification – Scenario Description

| Verification | Reserve a book |

| Sce.# | Agent | Activity | Object | Actor |
|---|---|---|---|---|
| 1 | Library system | gets | reserved Item | from Interface |
| 2 | Library system | checks | customer status | from Database |
| 3 | Library system | finds | a status of book | from Database |
| 4 | Library system | changes | a status of book | from Interface |
| 5 | Library system | changes | customer Info | from Database |
| 6 | Library system | Informs | results | to Interface |
|  |  |  |  |  |
|  |  |  |  |  |

Next    Cancel

<R, AM[]  → <adv. flow of AM elelemtns>
         → <adv. flow of points>
Flow of points → point-cut(points) → point-cut
--------------------------------------------------
<R, AM[]  → <adv. point-cut>

APPARATUS AND METHOD FOR PRODUCT-LINE ARCHITECTURE DESCRIPTION AND VERIFICATION

BACKGROUND OF THE INVENITON

1. Field of the Invention

The present invention relates to an apparatus and a method for product-line architecture description and verification, and more particularly, to an apparatus and a method for generating product-line architecture model describing commonality and variability, and verifying the generated product-line architecture model to satisfy requirements based on a scenario.

2. Description of the Related Art

A software product-line is defined as a set of software products or a set of software systems having similar functions. A product-line architecture is a representative software architecture for all products included in a software product-line. When a product is developed, a product architecture is instantiated from the product-line architecture based on product requirements. Components are assembled or newly developed according to the defined product architecture. The product-line has been spotlighted as a technology for rapidly manufacturing a newly developed product.

The most important asset of the product-line technology is the product-line architecture. A product architecture is defined according to the product-line architecture. For conveniently producing the product architecture from the product-line architecture, commonality and variability among various products in a product-line must be accurately described. Accordingly, there are many studies in progress for developing a method accurately describing the commonality and the variability of products in the product-line. However, there have been difficulties of the existing methods to describe the variability of products or to understand described variability of products. Therefore, the existing methods have not been widely used.

Accordingly, it has demanded a method for managing dependency relationship between complicated variant elements.

Moreover, it has required a method for verifying a designed architecture model to satisfy requirements of developed software before embodying the designed architecture model.

SUMMARY OF THE INVENTION

Accordingly, the present invention is directed to an apparatus and a method for product-line architecture description and verification, which substantially obviates one or more problems due to limitations and disadvantages of the related art.

It is an object of the present invention to provide an apparatus and a method for product-line architecture description and verification by automatically generating a product-line architecture model accurately describing commonality and variability and verifying the product-line architecture model to satisfy system requirements based on a scenario.

In the present invention, an apparatus and a method for product-line architecture description and verification automatically generates a product-line architecture model clearly describing dependency relationships of variability among components of the model based on Unified Modeling Language (UML) which is a de facto standard language for modeling.

Clear description of variability helps to understand a product-line architecture and to manufacture a product architecture. By using the UML for describing, a user may not learn a new language for understanding the product-line architecture model. By automatically generating the product-line architecture, a user may not consider relationship among complicated variant elements.

Also, in the present invention, a scenario is drawn up for verifying the generated product architecture model to reflect system requirements which could not be described by a conventional method, for verifying the generated product architecture model to reflect syustem requirements and those relationships to the architecture model. Scenarios are drawn up according to each of requirements and a verification aspect model is generated by mapping each of the scenarios to corresponding architecture model elements to verify the designed product-line architecture to satisfy the requirements. A verification medium and the verification aspect model of the present invention provide test cases for continuously testing the architecture model after embodying the architecture model to codes. Therefore, the analyzed requirements can be directly verified at a designed architecture model and an embodied real system.

Accordingly, it is an object of the present invention to provide a an apparatus and a method for product-line architecture description and verification by mapping variability and architecture models based on a scenario, generating a product-line architecture by extracting dependency relationship of variant elements according to variability, generating a scenario performing the requirements, classifying architecture models related to the generated scenario and generating a verification aspect model according to the classified architecture model.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an apparatus for a product-line architecture description and verification, including: a product-line architecture model conversion tool for classifying architecture model components according to variant characteristics by analyzing inputted scenarios, generating a dependency relationship model by extracting dependency relationship between architecture model elements based on variant elements, and generating a product-line architecture from an inputted architecture model based on the dependency relationship model; and a product-line architecture verification tool for receiving a scenario of a system requirement, mapping the scenario to related architecture model components, analyzing an architecture model dependency by analyzing static model information and dynamic model information of a product architecture, and generating an aspect model of the requirements, the scenario and the related architecture model components.

In another aspect of the present invention, there is provided a method for a product-line architecture description and verification, the method including the steps of: a) requesting describing commonality and variability of a product-line architecture and requesting verifying whether an architecture is described according to requirements; b) receiving an architecture model described by a static view and a dynamic view, and receiving scenarios of function to be modeled; c) classifying and describing an optional component and an alternative component for describing commonality and variability in a unit of a component according to each scenario and classifying and describing an optional connector and an alternative connector for describing commonality and variability in a unit of a connector according to each scenario; and d) verifying described architecture model.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention. In the drawings:

FIG. 11 is a view showing a user interface of a scenario input unit in accordance with a preferred embodiment of the present invention;

DETAILED DESCRIPTION OF THE INVENTION

Reference will now be made in detail to the preferred embodiments of the present invention, examples of which are illustrated in the accompanying drawings.

Figure 1:
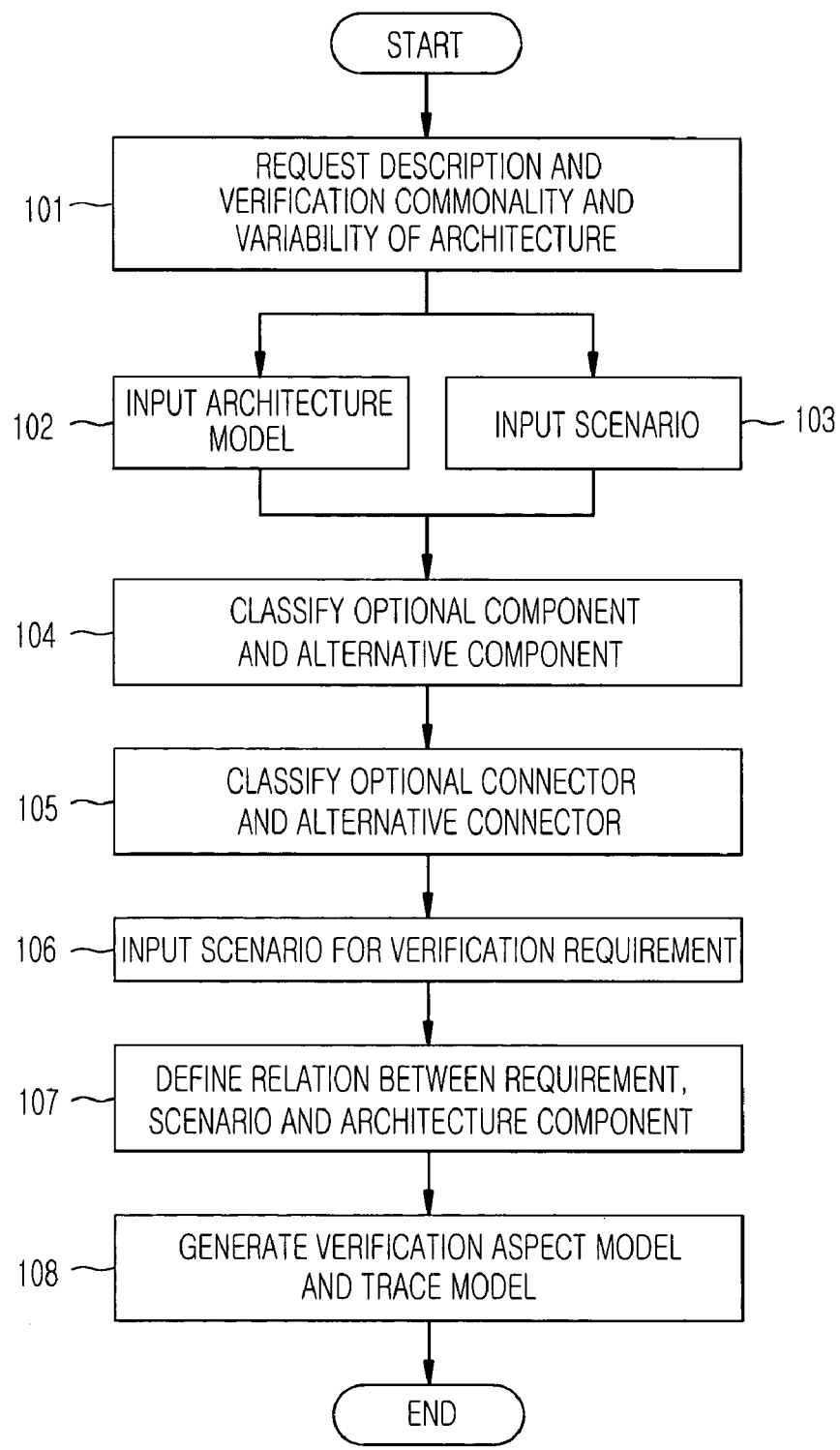
FIG. 1 is a flowchart illustrating operations of an apparatus for product-line architecture description and verification in accordance with a preferred embodiment of the present invention.

FIG. 1 is a flowchart illustrating operations of an apparatus for product-line architecture description and verification in accordance with a preferred embodiment of the present invention.

By referring to FIG. 1, a user of the apparatus requests for describing commonality and variability of a product-line architecture and verifying the described commonality and variability at step S101. The variability is described based on variability components including a variable point, components influenced by the variability and relationships between variabilities. The product-line architecture describing the commonality and the variability is verified whether sequential relationship between architecture model components related to software requirements.

An architecture model is inputted from the user at step S102. The architecture model is described by a static view and a dynamic view. In the static view of the architecture model, components of the architecture and interactions between the components are described. The connection relationships are formed by interaction between the components. In the dynamic view of the architecture model, behaviors of interactions among the components are described because the interaction is accounted as great prestige. A component and a connector are major elements of the static view. The component may be described by using component modeling element of the Unified Modeling Language (UML) 2.0. The connector may be described by using a collaboration element of the UML 2.0 since it is difficult to describe the complicated interaction between components by using a connector of the UML 2.0. The dynamic view describes a behavior of a connector representing the interaction between components by using an activity diagram.

Scenarios of functions to be modeled are inputted at step S103. The scenarios are drawn up according to each of functions and are described as a sequence diagram having a plurality of steps. The steps in the scenario are mapped to the related components and the scenario includes mapping information of the steps. Also, the steps in the sequence diagram of the scenarios are described to be indicated as an optional function or an alternative function.

Steps S104 and S105 are performed according to each of scenarios. At step S104, the commonality and the variability are described in unit of a component. That is, the variability and the commonality are described by classifying an optional component and an alternative component at step S104. Also, the commonality and the variability are described in a unit of a connector by classifying an optional connector and an alternative connector at step S105.

The architecture model is defined by the steps S102 to S105 and the defined architecture model is verified at steps S106 to S108. At the step S106, Scenarios are inputted for verifying the defined architecture model to be satisfied by requirements in analyzing steps. The scenarios include requirements to be verified. The inputted scenarios are mapped to related components of the architecture model and relationships between each of the scenarios and related components are defined at step S107. That is, architecture components to be verified and flows among the architecture components are defined at step S107. At step S108, a verification aspect model is generated by analyzing the defined requirements, the scenarios and the relationships between architecture model components and errors are classified by tracing the architecture model according to analysis result.

Figure 2:
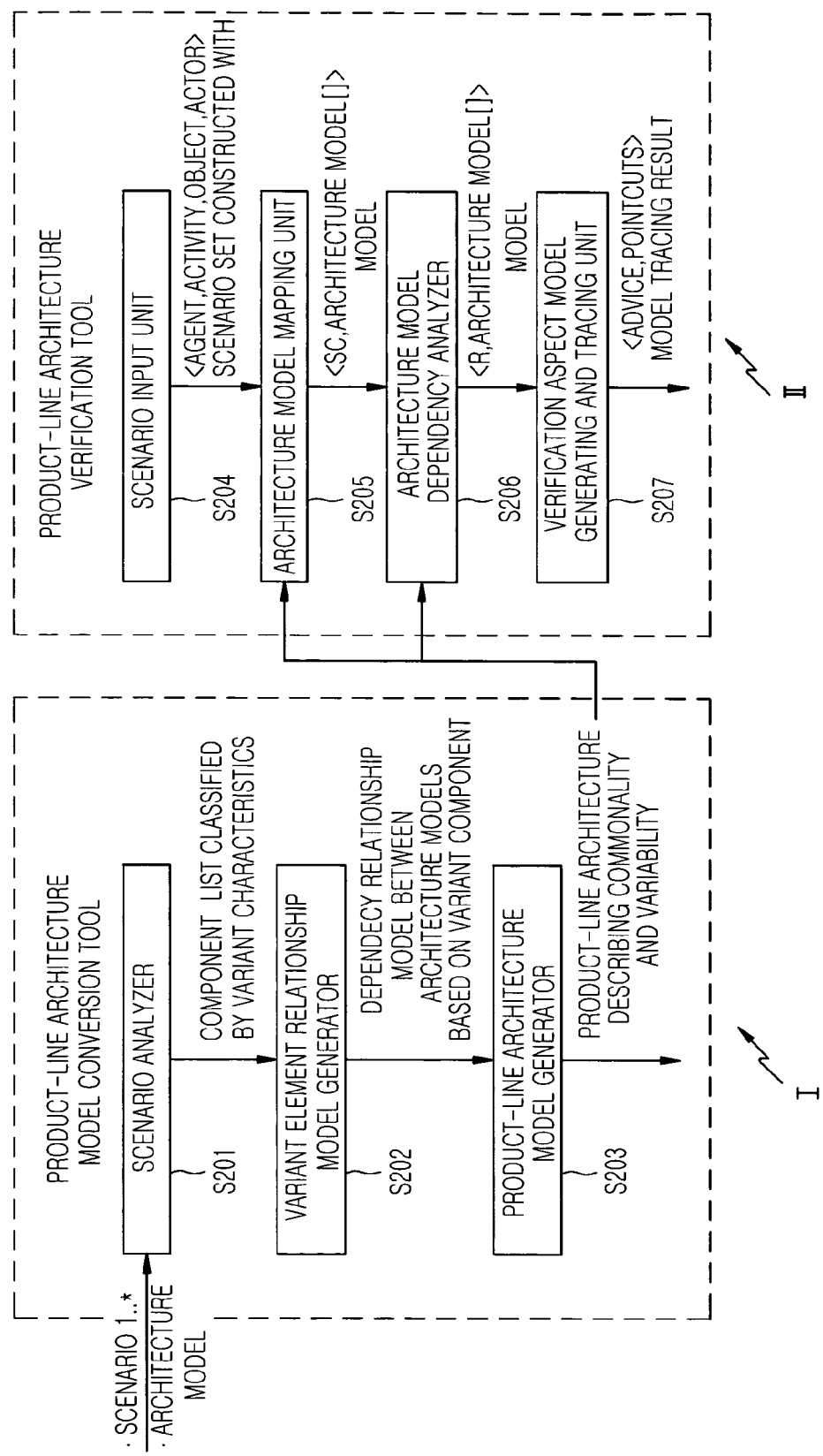
FIG. 2 is a diagram illustrating an apparatus for a product-line architecture description and verification in accordance with a preferred embodiment of the present invention.

FIG. 2 is a diagram illustrating an apparatus for a product-line architecture description and verification in accordance with a preferred embodiment of the present invention. The apparatus includes a product-line architecture model conversion tool I and a product-line architecture verification tool II.

The product-line architecture model conversion tool I generates a product-line architecture model and includes a scenario analyzer 201 for analyzing a scenario for embodying a product-line architecture and a variant element relationship model generator 202 for forming a dependency relationship among the variant elements, and a product-line architecture model generator 203 for automatically converting the inputted architecture model to the product-line architecture.

The product-line architecture verification tool II includes a scenario input unit 204 for receiving scenarios of requirements to be verified for verifying the product architecture, an architecture model mapping unit 205 for mapping each of scenarios to related architecture model components, an architecture model dependency analyzer 206 for classifying architecture components dynamically related to the mapped architecture components, and a verification model generating and tracing unit 207 for generating a verification aspect model among requirements, scenarios and components related to architecture models and verifying the generated verification aspect model.

The scenario analyzer 201 analyzes the inputted scenarios for generating a product-line architecture model and classifies architecture model components according to variant characteristics.

The variant element relationship model generator 202 extracts dependency relationships between the architecture model elements based on a variant element.

The product-line architecture model generator 203 automatically converts the classified variant element to corresponding description type from an inputted architecture model based on the dependency relationship model.

The scenario input unit 204 receives the scenarios of requirements for verifying a product-line architecture model to be satisfied by system requirements.

The architecture model mapping unit 205 maps the inputted scenarios to related component of the product architecture model.

The architecture model dependency analyzer 206 classifies architecture components to be performed with architecture components mapped to the scenarios or influencing the architecture components mapped to the scenarios by analyzing static and dynamic modeling information of a product architecture and adds the classified components to the verification model.

The verification aspect model generating and tracing unit 207 generates a verification aspect model based on the defined requirements, the scenario, the relationships between components of architecture model, and dependently manages and traces the generated models according to each of the requirements.

Hereinafter, a method for product-line architecture description and verification is explained by referring to FIGS. 3 to 15.

Figure 3:
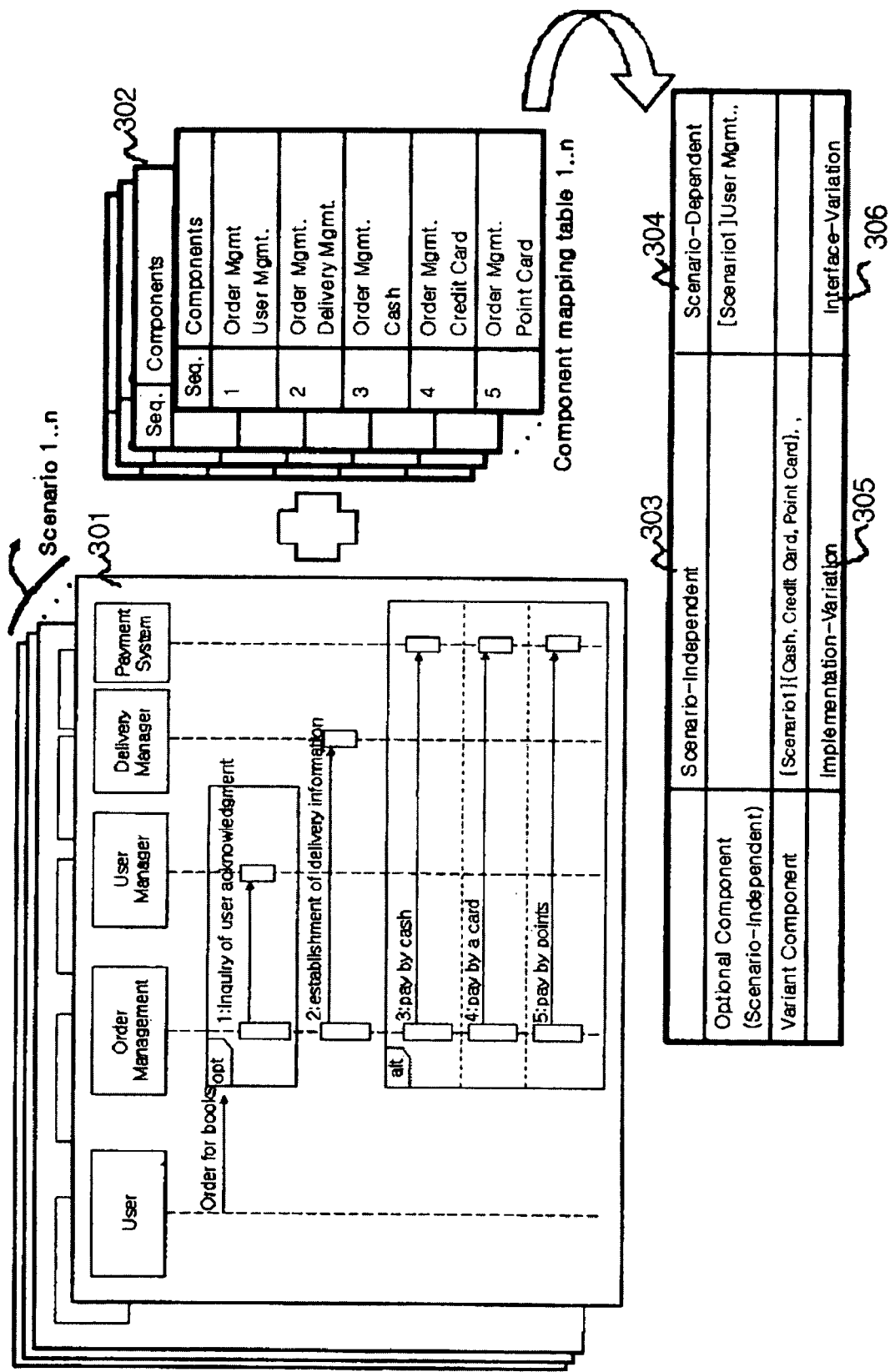
FIG. 3 is a diagram showing scenarios inputted from a user, component mapping tables and component models classified based on variant characteristics.

FIG. 3 is a diagram showing scenarios, component mapping tables and component models classified based on variant characteristics.

The component mapping table 302 is formed by inputting component names included in each of steps of the scenario drawn up as a sequence diagram. If an opt operator which is a conditional selection operator is used in the sequence diagram in a step, the component mapped to the step is considered as the component having an optional function. If an alt operator is used in a step, the component mapped to the step is considered as the component having an alternative function.

The scenario analyzer 201 classifies the components as following conditions. The scenario analyzer 201 determines whether a component mapped to the step the opt operator is used is included in other scenarios. If the other scenarios do not include the component, the scenario analyzer classifies the component as an optional component of scenario-independent 303 as shown in FIG. 3. If the component is included in other scenarios, the scenario analyzer classifies the component as an optional component of scenario-dependent 304 as shown in FIG. 3. Also, the scenario analyzer compares interfaces of a component mapped to the step the alt operator is used to interfaces of the component of the inputted architecture model. If they are identical, the scenario analyzer classifies the component as an alternative component of implementation-variation 305 as shown in FIG. 3 which can be implemented without changing the interface. If they are not identical, the scenario analyzer classifies the component as an alternative component of interface-variation 306 which is implemented by changing the interface.

Figure 4:
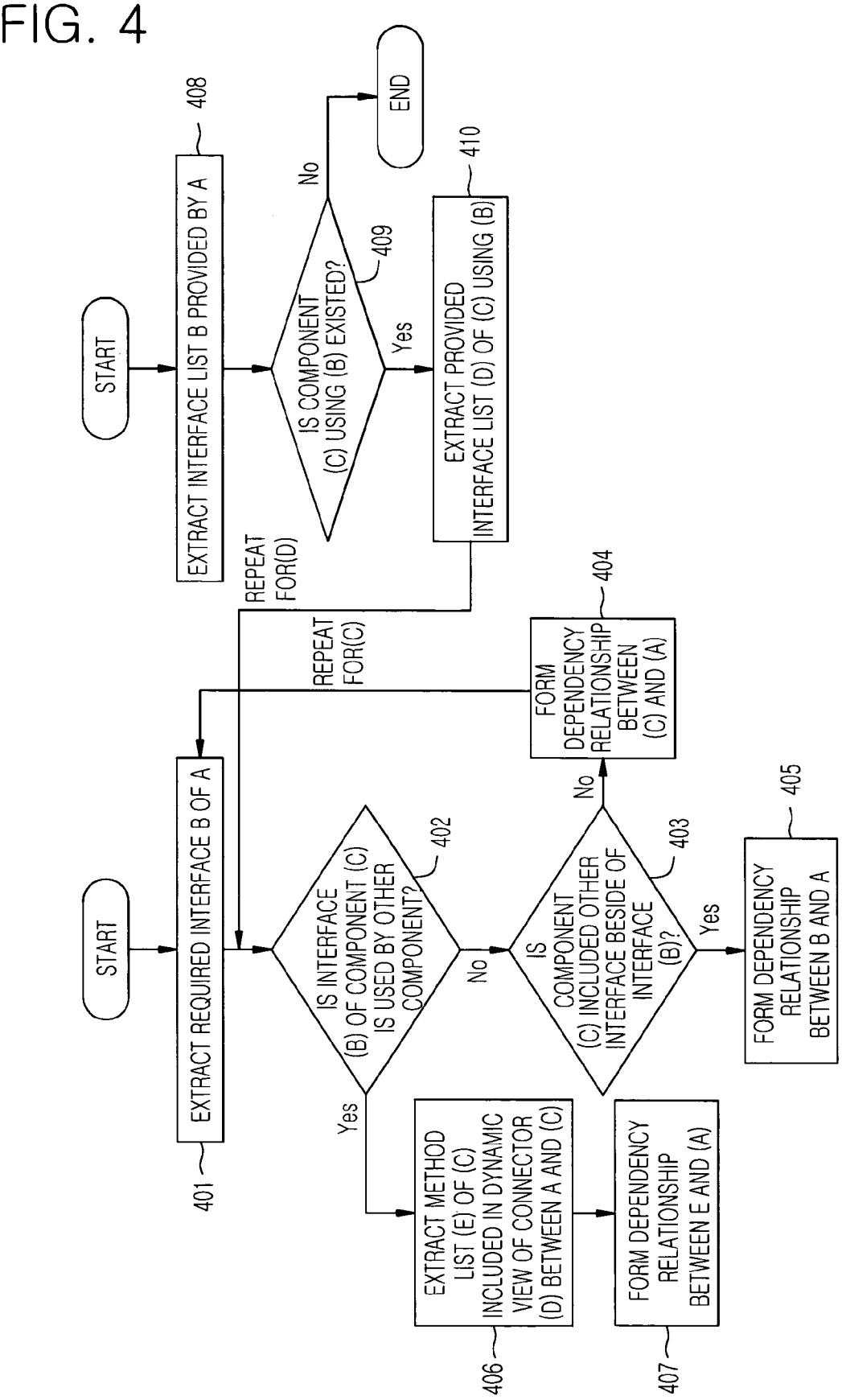
FIG. 4 is a flowchart showing an algorithm performed in a variant element relationship model generator.

FIG. 4 is a flowchart showing an algorithm performed in a variant element relationship model generator.

A component may affect other architecture modeling elements according to an optional aspect and an alternative aspect. Therefore, relationships with the architecture modeling elements affected by the variant elements must be managed and also they must be described and verified. Accordingly, the variant element relationship model generator forms a dependency relationship with other elements affected by the optional component and the alternative component.

As shown in FIG. 4, a required interface B used in the optional component A is extracted at step 401 for forming a dependency relationship affected by the optional component. And, it determines whether the required interface B is used by other components in a viewpoint of a component C which provides the interface B at step 402.

If the interface B is not used by other components at the step 402, the interface B is only necessary to the optional component A. In this case, it determines whether the component C provides other interfaces beside the interface B at step 403 for verifying to form a dependency relationship in a unit of the component C. If the component C does not provide other interfaces beside the interface B at step 403, a dependency relationship in unit of the component C is formed and it is returned to the step 401. If the component C provides other interfaces, a dependency relationship in unit of the interface B is formed.

Meanwhile, if the interface B is used by other components at step 402, the interface B is required to other components beside the optional component A. In this case, a method list E of the component C is extracted from a connector D which is an interaction part between the optional component A and the component C at step 406. And, a dependency relationship of the optional component A with corresponding method E is formed at step 407.

For forming a dependency relationship affected by an alternative component, an interface B provided from the alternative component A is extracted at step 408. After extracting, it determines whether there is a component C using the provided interface B at step 409. If the component C is not existed, it means there is no component affected by the alternative component. If there is the component C at step 409, it means that there is the component C using the interface B as the required interface. Accordingly, a provided interface D is extracted because the required interface is necessary to the provided interface D of the component C. And then, the step 402 is performed again for classifying a dependency relationship as the dependency relationship in unit of component, a dependency relationship in unit of interface or a dependency relationship in unit of method.

Figure 5:
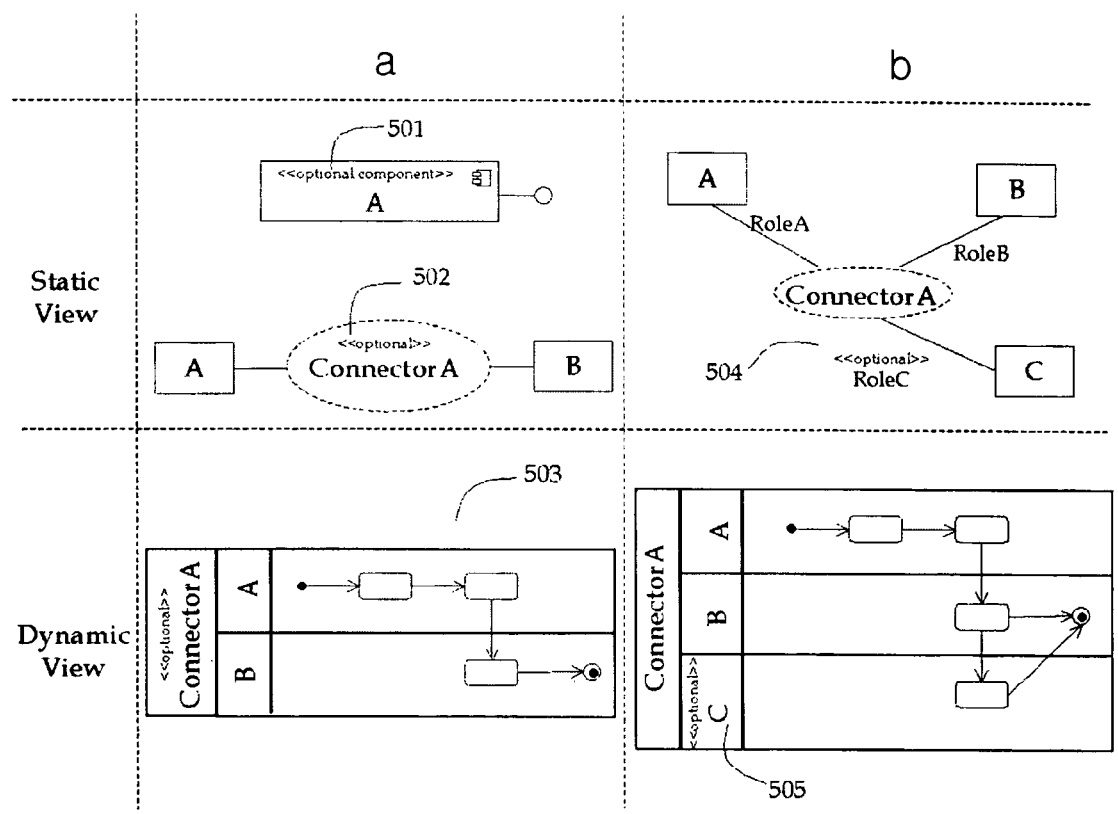
FIG. 5 is a view showing expression types of an optional component in a static view and in a dynamic view.

FIG. 5 is a view showing expression types of an optional component in a static view and in a dynamic view.

In case of the optional component, the expression type may be divided according to two cases as follows.

A first case is a case of function expansion as independent individual function which is not used by other functions and other scenarios. A second case is a case that a function performed by a component on a scenario is optional.

The first case means an independent function which is not related to other function. That is, the first case is a case that the function performed by corresponding component is not a necessary function, which is the optional function. A component included in single scenario is included in the first case. For describing the optional component of the first case, the optional component is described by defining the stereotype <<optional component>> based on UML extension mechanism stereotype of corresponding component in the static view as shown in 501 of FIG. 5. Also, an interaction started by corresponding component must be described because it is affected whether the optional component is included or not. The interaction started by the optional component means that the interaction is optional. Accordingly, the optional component in this case is described by defining the stereotype <<optional>> as shown in 502 in FIG. 5. In the dynamic view, the connector is optional so it is described by defining the stereotype <<optional>> as shown in 503 in FIG. 5 for describing a diagram of corresponding connector is optional.

In the second case b in FIG. 5, if a component in a scenario is optional, it means that corresponding component is performed as optionally in corresponding scenario. The role of the corresponding component in the scenario must be described as an optional role. When the optional role is not required, the corresponding component can be omitted in the scenario. Since the scenario can be represented by a connector that is notated using a collaboration notation, we define and use the stereotype <<optional>> for the optional role of the collaboration in the static view as shown in 504 in FIG. 5. In the dynamic view, an optional role of corresponding component is described by defining the stereotype <<optional>> in a role region of corresponding component as shown in 505 of FIG. 5.

Figure 6:
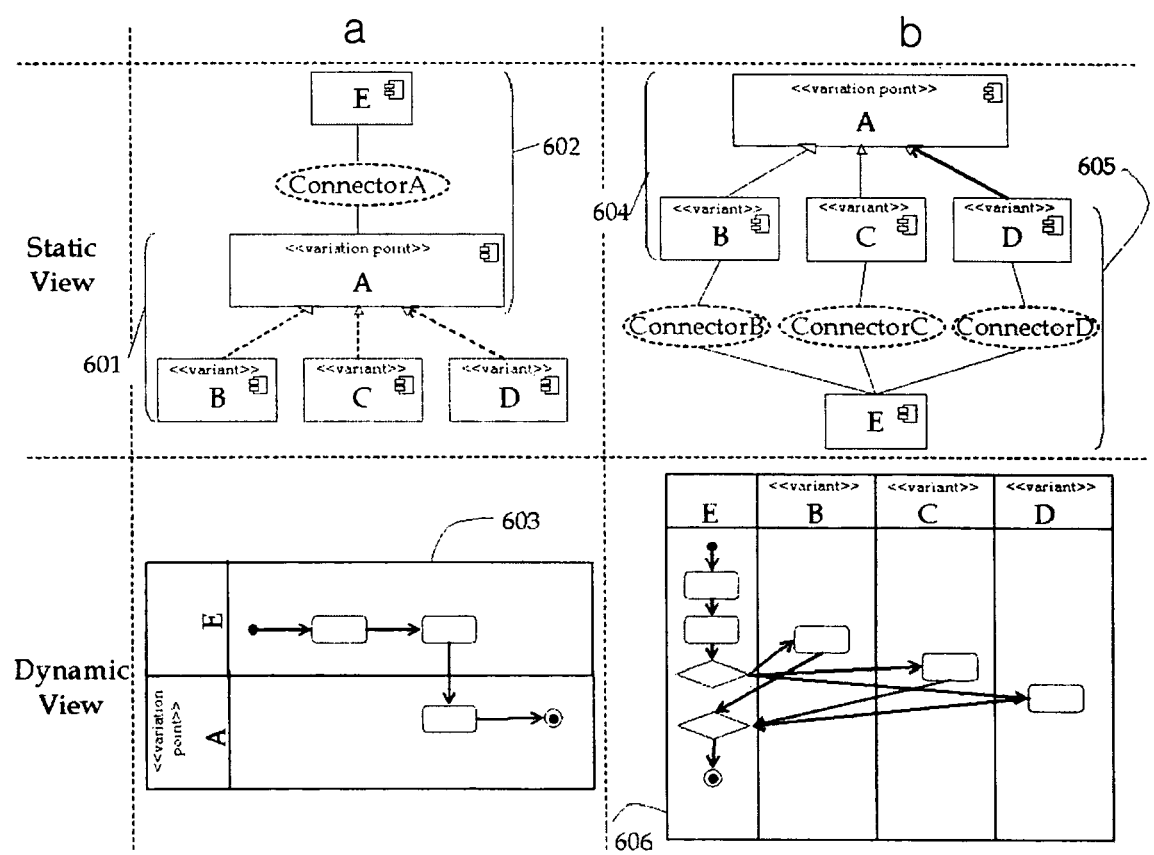
FIG. 6 is a view showing expression types of an alternative component in a static view and in a dynamic view.

FIG. 6 is a view showing expression types of an alternative component in a static view and in a dynamic view.

The alternativeness in a unit of component is divided to a first case that components may be variously implemented without changing an interface and a second case that a component is implemented by changing the interface because different functions are required and provided for embodying the component. An expression type of the first case is shown in "a" of the FIG. 6. The first case is a case of having common interface but differ implementation of each interface. Therefore, it is described by defining single abstract component of a group of alternative components and defining the stereotype <<variation point>> for the abstract component as shown in 601 of FIG. 6. A relationship with alternative components is described by using a realization relationship. In this case, since an interaction between each of alternative components and other components use identical interface, an interaction between the abstract component and other components can be described in the static view instead of describing the interaction between each of variants and other components. Accordingly, the interaction between the abstract component and other component E is described by defining a representative connector "ConnectorA". Also, in the dynamic view, a behavior of "ConnectorA" is described as shown in 603 of FIG. 6.

An expression type of the second case is shown in "b" of FIG. 6. In the second case, single abstract component of alternative components is defined in a static view since it is an expression type of variant changing an interface. In this case, the abstract component is defined to include only common interface of all variants. As shown in 604 of FIG. 6, the abstract component is expressed by defining the stereotype <<variant point>>. A relationship with the alternative components is expressed by using a specialization relationship. Since interfaces of alternative components may be different from the common interface, interfaces for each alternative component, which are not included in the common interfaces, have to be additionally represented. Since the second case is a case of changing interfaces, each variant may have different interactions with other components. Therefore, the interactions are described by defining connectors according to each of the interactions as shown in 605 of FIG. 6. In the dynamic view, connectors ('ConnectorB', 'ConnectorC', 'ConnectorD') may be described as single independent diagrams or the connectors may be described as one diagram if the interaction of each connector is included in an interaction of other connector as shown in 606 of FIG. 6.

Figure 7:
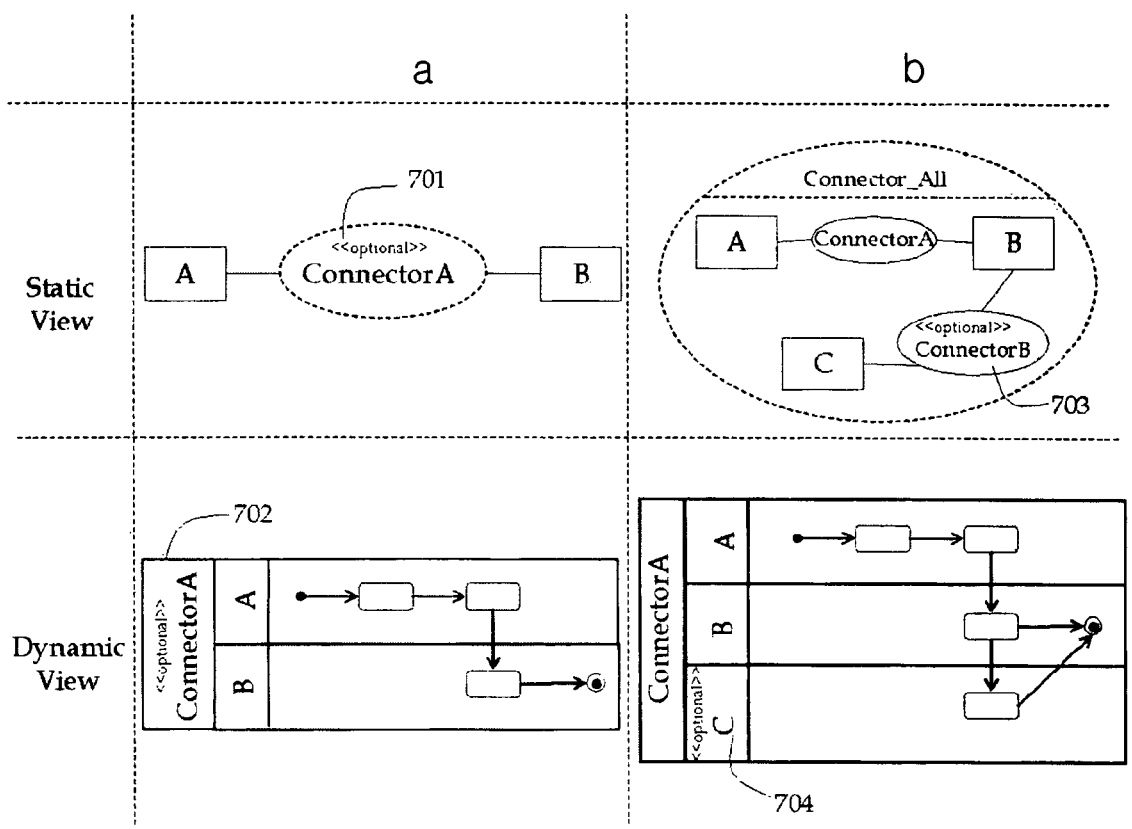
FIG. 7 is a view showing expression types of an optional connector in a static view and in a dynamic view.

FIG. 7 is a view showing expression types of an optional connector in a static view and in a dynamic view. Description type of the optional connector is also divided to two cases. A first case is an optical case by function expansion as an independent individual function which is not used to other scenario. A second case is a case that an optional part scenario is existed on a scenario.

Description type of the first case is shown in "a" of FIG. 7. In the static view, the optional connector is described by defining the stereotype <<optional>> as shown 701 in FIG. 7 since the scenario is optional. In the dynamic view, the optional connector is described by defining the stereotype <<optional>> for entire active diagram describing the scenario as shown in 702 of FIG. 7.

Description type of the second case is shown in "b" of FIG. 7. That is, the second case is a case that an optional scenario or an optional connector contained in a collaboration representing whole scenario in the static view. In the static view, the optional connector is described by defining the stereotype <<optional>>. In the dynamic view, a diagram is divided a plurality of parts according to scenarios and a divided part of the diagram related to an optional scenario is defined as the stereotype <<optional>> for describing the optional connector as shown in 704 of FIG. 7.

Figure 8:
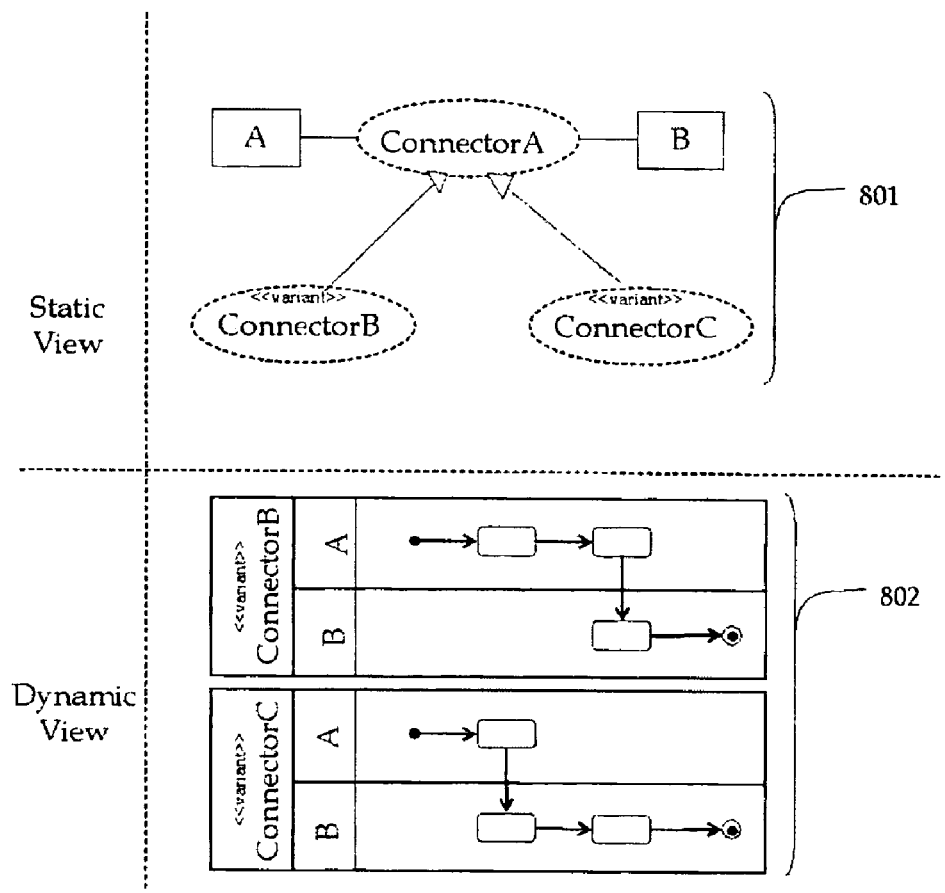
FIG. 8 is a view showing expression types of an alternative connector in a static view and in a dynamic view.

FIG. 8 is a view showing expression types of an alternative connector in a static view and in a dynamic view. In case of a alternativeness in a unit of a connector, it can be considered as a modification of function without changing a component. In the static view, an alternative connector is described by defining a connector included in a mostly used scenario as higher level connector as shown in 801 of FIG. 8. In the dynamic view, the alternative connector is expressed as 802 in FIG. 8.

Figure 9:
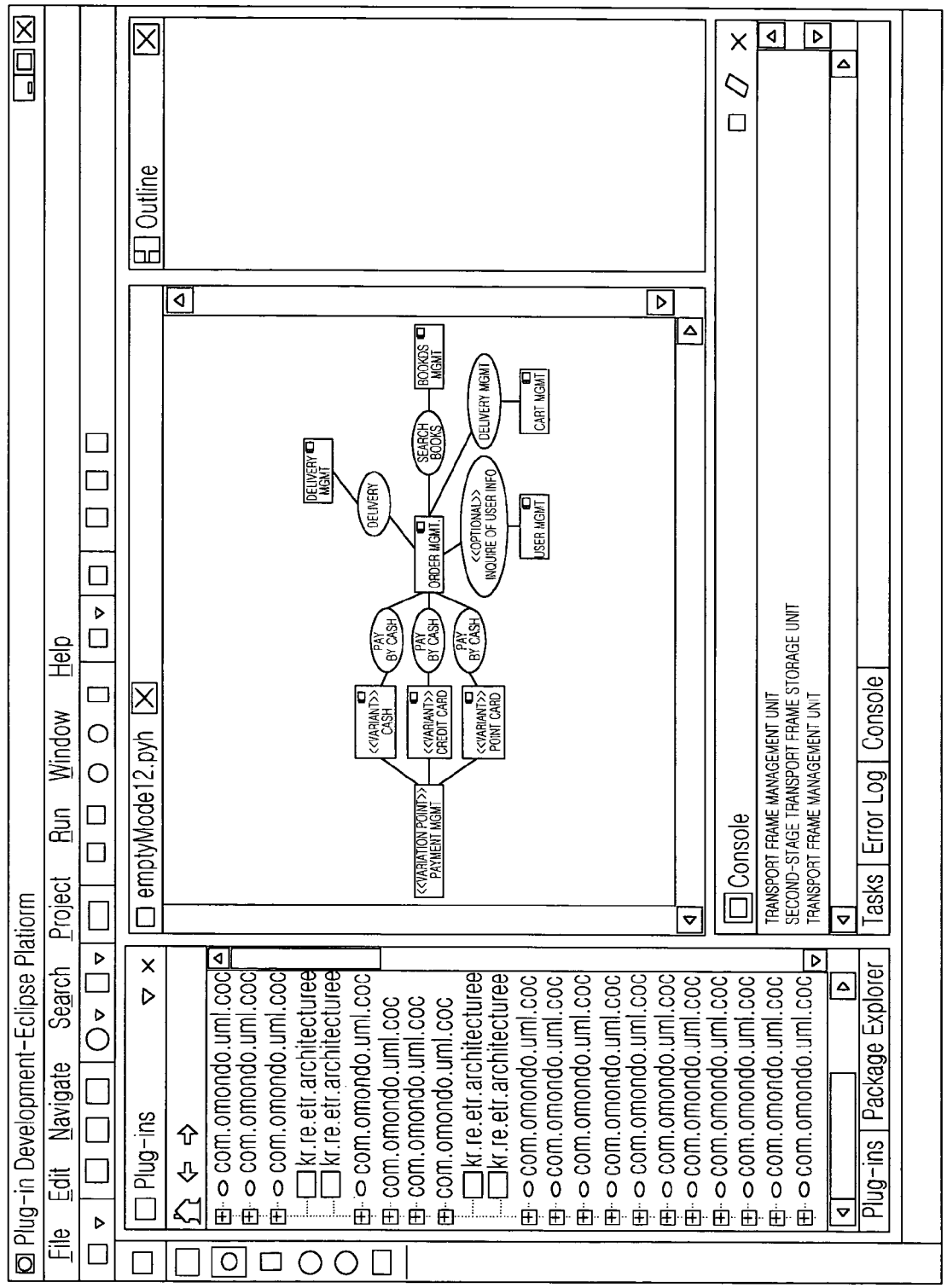
FIG. 9 is a view showing a static view of a product-line architecture model generated by a product-line architecture model generator.

FIG. 9 is a view showing a static view of a product-line architecture model generated by a product-line architecture model generator.

Figure 10:
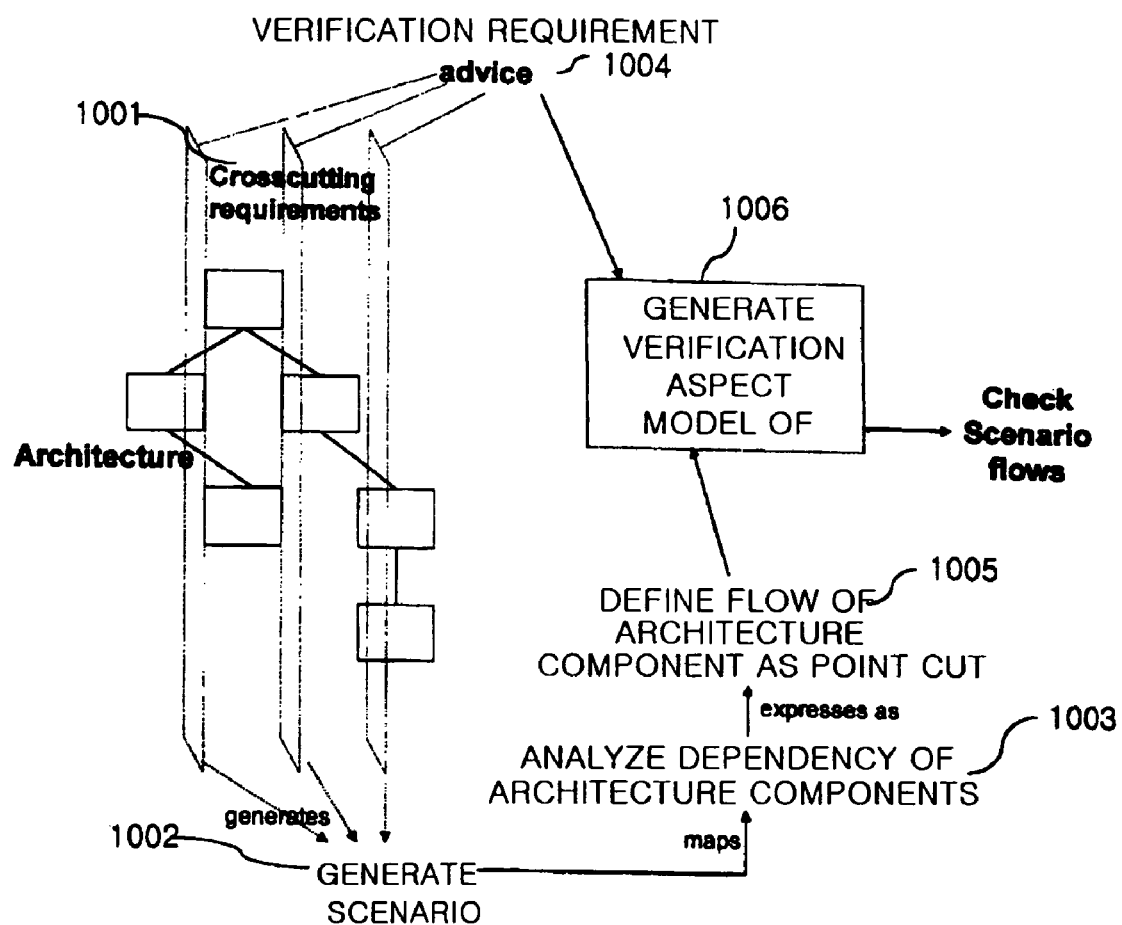
FIG. 10 is a view showing a method for generating and verifying an architecture verification aspect model based on a scenario.

FIG. 10 is a view showing a method for generating and verifying an architecture verification aspect model based on a scenario. In FIG. 10, a scenario 1002 of each requirement is generated for verifying requirements 1001 reflected to an architecture model. The generated scenario is mapped to element of architecture model and a dependency 1003 between architecture model element is analyzed. After analyzing, the requirement and the architecture model elements mapped to the requirement is managed in a single view point. A <adv, point-cuts> of verification aspect model 1006 is generated by defining the requirement to be verified as an advice 1004 and defining a flow of corresponding architecture model elements as a point-cuts 1005. After generating the verification aspect model 1006, the relationship between elements defined as the point-cut is inspected. The advice and the point-cut implemented to the present invention is embodiment of a concept of Aspect-Oriented Programming (AOP). The advice is defined for starting verification of predetermined requirements and it is the starting point for executing the real verification of the architecture model components defined as the point-cut.

FIG. 11 is a view showing a user interface of a scenario input unit in accordance with a preferred embodiment of the present invention. That is, the view of FIG. 11 shows a user interface receiving a scenario of "Reserve a book" requirement which is a variant, requirement to implement a library system. A numeral reference 1101 represents a structure of the inputted scenario. The scenario is constructed by including fields of a scenario number, an agent representing a subject performing the scenario, an activity representing a performing operation, an object representing an object to be performed, and an actor obtaining the object. The scenario defined in FIG. 11 is an interaction scenario of internal system for "Reserve a book". The actor and the agent are components described as architecture model elements. The scenario defined as shown in FIG. 10 is stored as requirement-scenario model of <R, ScG[Sc1, Sc2, . . . ]>. R represents a requirement and ScG[ ] represents scenarios for the requirement.

Figure 12:
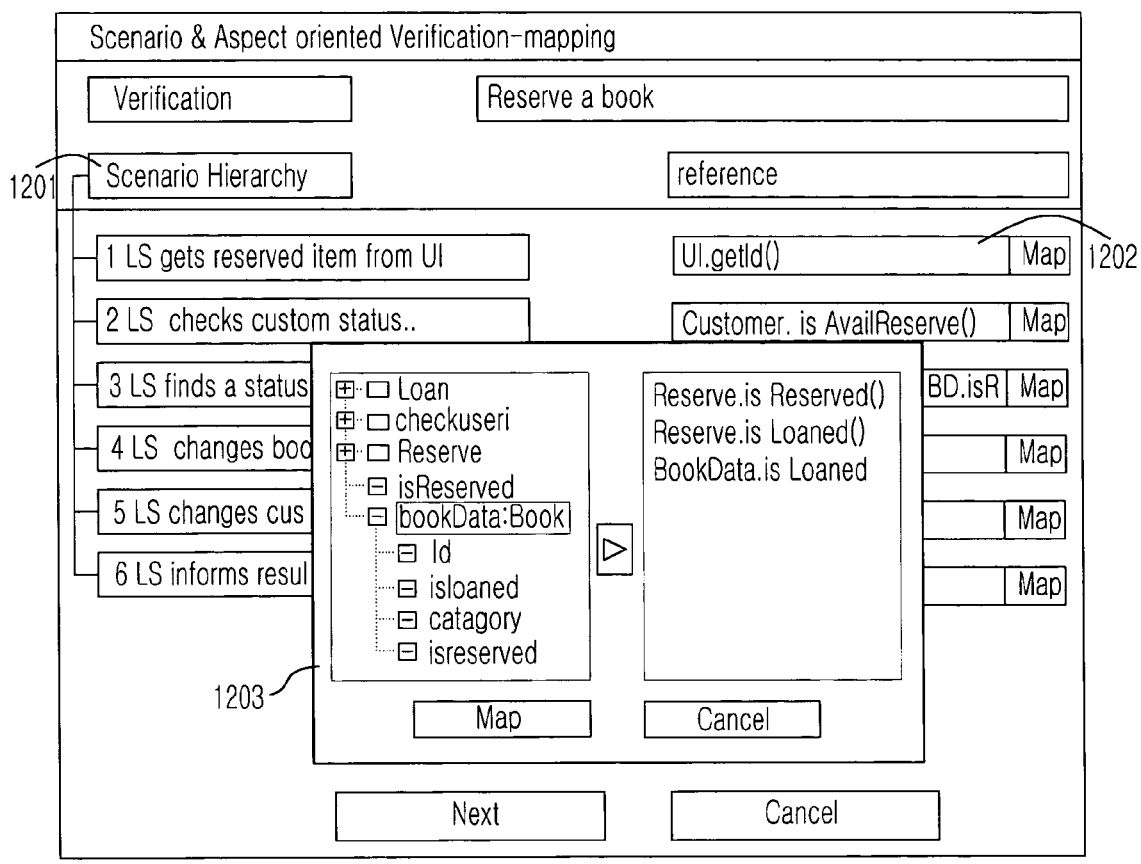
FIG. 12 is a view of a mapping user interface (UI) showing mapping relationships between a scenario model stored in the FIG. 11 and an architecture model.

FIG. 12 is a view of a mapping user interface (UI) showing mapping relationships between a scenario model stored in the FIG. 11 and an architecture model. For "Reserve a book" variant requirement, the scenario defined in FIG. 11 are constructed as a tree form having hierarchical structure as shown in a number reference 1201 of FIG. 12 and there is a selection field 1202 for mapping each scenario to corresponding element of the architecture model. If "Map" button of the mapping user interface (UI) is pressed, an additional user interface 1203 is shown for the mapping operation. The components related to the scenario are selected by using the additional user interface 1203. Architecture models elements considered during mapping could be mapped to corresponding components, component functions and component attributes defined in a static view of architecture described in FIGS. 5 to 8. The relationship between the scenario and architecture model is described as <Sc, AM[AM1, AM2, . . . ]>. It represents single scenario is related to more than one architecture models. Each generated <Sc, AM[ ]> model is unified to a <R, AM[ ]> model to be described as an architecture model related to the requirement of verification.

Figure 13:
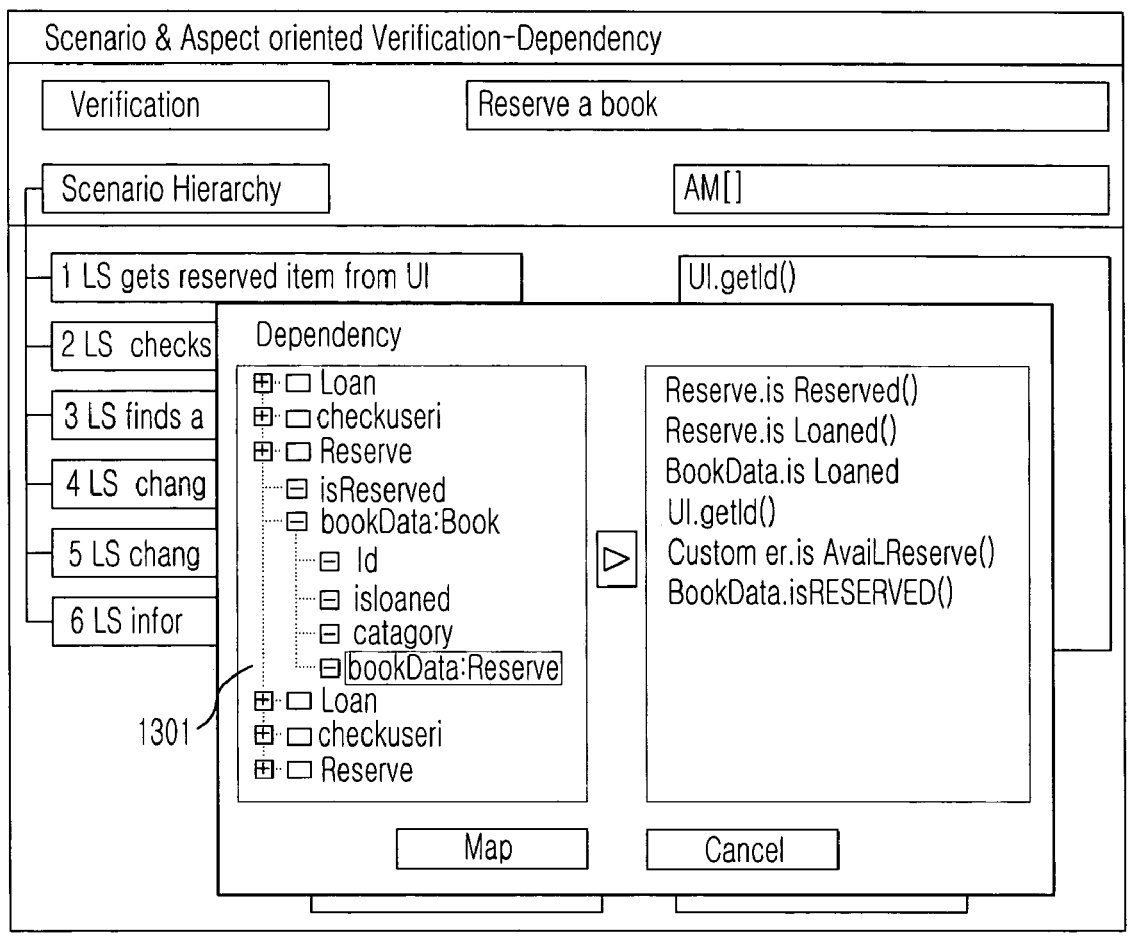
FIG. 13 is a user interface of a dependency analyzer for analyzing a dependency between architecture models.

FIG. 13 is a user interface of a dependency analyzer, which finds the elements related to architecture model defined in a field 1202 of the mapping use4r interface in FIG. 12 and analyze the dependency among those elements. The architecture models related to verification requirements are basically the architecture models mapped by the scenario. Additionally, the architecture models related to verification requirements include architecture elements related to the selected architecture elements. It can be derived by analyzing architecture model elements information described through FIGS. 5 to 8. The additional architecture model elements are added to the <R, AM[ ]> model generated in FIG. 12. That is, the additional elements or methods are classified based on a connector which is described by behavior modeling using a dynamic view of an architecture described in FIGS. 5 to 8. A dialog window 1301 is an user interface for adding corresponding model elements to <Sc, AM[ ]> model by analyzing the dependency of architecture components. For example, a connector connected to a "is Reserved()" method of "Reserve" component is found and the methods connected to the connector is added to <Sc, AM[ ]> for the "Reserve" component shown in FIG. 12. A "Reserve.is Reserved( )" method in FIG. 13 is connected by a "reservation" connector and it determines that "reservation" connector calls a "BookData.is Reserved( )" method by analyzing a dynamic view of the "reservation" connector. That is, "BookData.is Reserved( )" is added to an architecture component set mapped to a scenario.

Figures 14, 15:
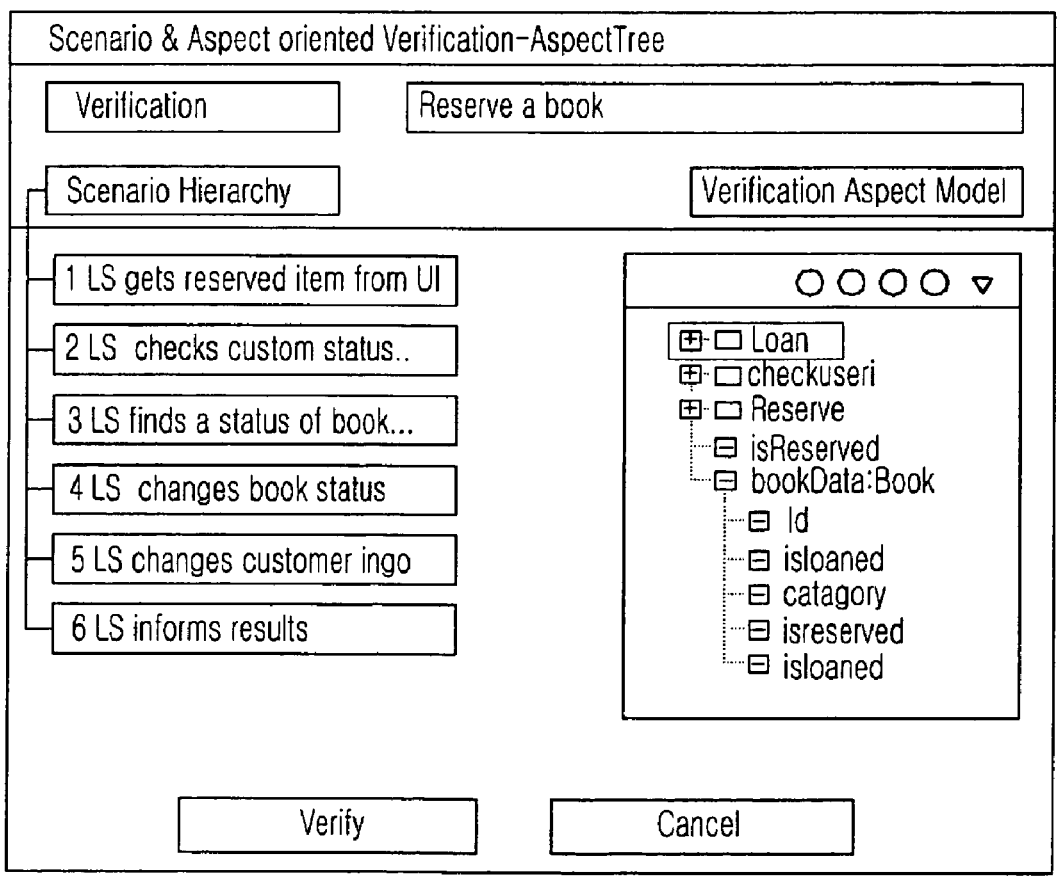
FIG. 14 is a view showing forming a sequential relation of flow of points from a model.
FIG. 15 is a view of a user interface showing a verification aspect model tree generated by a verification aspect model generator in accordance with a preferred embodiment of the present invention.

In <R, AM[ ]> of FIGS. 12 and 13, the architecture model AM[ ] means all architecture elements related to the scenario of requirement R and sequential relationships are defined according to flow of the scenario. A verification aspect model is generated by defining R as an advice of verification aspect for one requirement and AM[ ] as a set of points performing the advice, that is called a point-cut. Architecture model elements related to the requirement R is defined as a point. And sequential relationships of flow of points are defined at the point-cut. An advice ordering to perform the point-cut is mapped to the requirement R. That is, the requirement R is mapped to the advice and the architecture model AM[ ] may be described as the point-cut. FIG. 14 shows a method for deriving <adv, point-cut> from <R, AM[ ]>.

FIG. 15 is a view of a user interface showing a verification aspect model tree <adv, p> generated by a verification aspect model generator in accordance with a preferred embodiment of the present invention. Architecture model elements for satisfying requirement "Reserve a book" are described as a verification aspect model tree. It verifies whether the scenario is well reflected to the architecture components described at the tree by tracing the verification aspect model.

As mentioned above, the present invention automatically generates and manages descriptions of the commonality and the variability of the product-line architecture. Also, the present invention provides a function for verifying the product-line architecture whether requirements of a system analyzing step are reflected to the product-line architecture.

Also, the present invention automatically generates description of the commonality and the variability, and manages the complicated dependency relationships between the variabilities for describing the product-line architecture. Therefore, the present invention improves visibility of the architecture and makes it easy to verify. Furthermore, the present invention extends the de facto standard Unified Modeling Language (UML) for describing the architecture. Therefore, a user can easily understand the description of the architecture and conveniently use a conventional UML tools.

Moreover, the present invention can verify a designed model to satisfy requirements before embodying the designed model to a code by drawing up the scenario of requirements to be verified and connecting the scenario to the architecture model. The generated verification aspect mode can be re-used as basic test case for verifying the embodied code after verifying the designed model.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An apparatus having a processor for a product-line architecture description and verification, comprising:
    a product-line architecture model conversion tool configured to operate on a computer in order to classify related architecture model components according to variant characteristics by analyzing inputted scenarios, generating a dependency relationship model by extracting a dependency relationship between the architecture model components based on a variant element, and generating the product-line architecture from an inputted architecture model based on the generated dependency relationship model; and a product-line architecture verification tool configured to operate on the computer in order to receive a scenario of a system requirement, mapping the scenario to the related architecture model components, analyzing an architecture model dependency by analyzing static modeling information and dynamic modeling information of the product-line architecture, and generating an aspect model of the requirement, the scenario and the related architecture model components;

wherein the product-line architecture model conversion tool includes:

a scenario analyzer for classifying the architecture model components according to the variant characteristics by analyzing the inputted scenarios for implementing the product-line architecture;

a variant element relationship model generator for generating the dependency relationship model by extracting the dependency relationship between the architecture model components based on the variant element and managing the generated dependency relationship model for describing elements changed by the variant element; and a product-line architecture model generator configured to operate on a computer for generating the product-line architecture from the inputted architecture model based on the dependency relationship model, the product-line architecture model generator includes:

an optional function used when an opt operator is used; and
an alternative function used when an alt operator is used;

wherein the architecture model components are classified as an optional component based on expansion of independent individual function if a component mapped using the opt operator is not included in another scenario, and the architecture model components are classified as a component of the optional function if the component mapped to the opt operator is included in other scenario; and wherein the architecture model components are classified as a variant component changing embodiments without changing the interface if interfaces of components mapped using the alt operator are identical to the interface of an architecture model, and the architecture model components are classified to a variant component changing the interface if the interfaces of the architecture model components are not identical to the interface of the architecture model.

2. The apparatus of claim 1, wherein the product-line architecture verification tool includes:

a scenario input unit for receiving the scenario performed according to the system requirement for verifying a product-line architecture model; an architecture model mapping unit for mapping related components of an architecture model to the received scenario;

an architecture model dependency analyzer for classifying architecture components to be performed with architecture components mapped to the scenario and components influencing other architecture components by analyzing the static modeling information and the dynamic modeling information of the product architecture, and adding the classified architecture components to a verification model; and a verification aspect model generating and tracing unit for generating an aspect model of the requirement, the scenario and the components related an architecture model, and verifying the generated aspect model.

3. A method of generating a product-line architecture description and verification, the method comprising the steps of:

a) requesting for describing commonality and variability of a product-line architecture and requesting for verifying whether an architecture is described according to requirements;

b) receiving on a computer an architecture model described by a static view and a dynamic view, and receiving scenarios of function to be modeled;

c) classifying and describing an optional component and an alternative component for describing commonality and variability in a unit of components according to each scenario and classifying and describing an optional connector and an alternative connector for describing commonality and variability in a unit of connectors according to each scenario; and d) verifying the described architecture model;

wherein each scenario is described as a sequence diagram and describes an optional function and an alternative function of each step included in the scenario or a group of a plurality of steps, and describes mapping information with the components related to each step of each scenario, wherein the sequence diagram includes the optional function when an opt operator is used and the alternative function when an alt operator is used;

the components are classified as an optional component based on expansion of independent individual function if a component mapped to a step using the opt operator is not included in other scenario, and the components are classified as a component of an optional function if the component mapped to the step using the opt operator is included in other scenario;

the components are classified as a variant component changing embodiments without changing an interface if interfaces of components mapped to steps using the alt operator are identical to an interface of the architecture model, and the components are classified to a variant component changing the interface if the interfaces of the components are not identical to the interface of the architecture model.

4. The method of claim 3, wherein forming a dependency relationship to other components influenced by the optional component and the alternative component for describing the commonality and variability in the unit of the components in the step c) includes the steps of:

c-1) extracting a required interface from the optional component;

c-2) determining whether the required interface is used by other component in a view of a component providing the required interface;

c-3) determining whether the component providing the required interface provides other interfaces beside of the required interface when the required interface is not used by other component, forming a dependency relationship in a unit of the component providing the required interface and returning to the step c-I) when other interfaces are not provided, and forming a dependency relationship in a unit of the required interface when other interfaces are provided; and c-4) forming a dependency relationship to an optional component for corresponding method by extracting a method list of the component providing the required interface from a connector with an interaction part between the optional component and the component providing the required interface when the required interface is used by other component.

5. The method of claim 4, wherein forming the dependency relationship influenced by the alternative component includes the steps of:

extracting a provided interface of the alternative component;

determining whether a component using the required interface exists and extracting a second interface of the alternative component when the component using the required interface exists; and performing the step c-2).

6. The method of claim 3, wherein the step d) includes the steps of:

receiving a scenario of the requirements to be verified;

connecting related architecture model elements to the received scenario and defining sequential relationship of connected architecture models; and detecting inconsistency by analyzing defined requirement, scenario, relationship between architecture model components, generating a verification aspect model based on the analysis result and tracing the generated verification aspect model.

* * * * *